United States Patent [19]

Venkatasetty

[11] 4,252,875
[45] Feb. 24, 1981

[54] ELECTRO-CATALYSTS FOR THE CATHODE(S) TO ENHANCE ITS ACTIVITY TO REDUCE SOCL$_2$ IN LI/SOCL$_2$ BATTERY

[75] Inventor: Hanumanthiya V. Venkatasetty, Burnsville, Minn.

[73] Assignee: Honeywell Inc., Minneapolis, Minn.

[21] Appl. No.: 140,069

[22] Filed: Apr. 14, 1980

[51] Int. Cl.$^3$ .............................................. H01M 6/14
[52] U.S. Cl. ................................... 429/196; 429/199; 429/212
[58] Field of Search ................ 429/101, 196, 199, 212

[56] References Cited

U.S. PATENT DOCUMENTS 4,093,784  6/1978  Driscoll ........................... 429/196 X

*Primary Examiner*—Charles F. Lefevour
*Attorney, Agent, or Firm*—John S. Munday

[57] ABSTRACT

In a lithium-thionyl chloride cell having a lithium anode, an electrolyte including thionyl chloride and a cathode with current collector, the improvement comprising a coating of a metal phthalocyanine complex on a said cathode. Particularly preferred are transition metal phthalocyanine complexes, such as copper and cobalt phthalocyanine.

10 Claims, No Drawings

ELECTRO-CATALYSTS FOR THE CATHODE(S) TO ENHANCE ITS ACTIVITY TO REDUCE SOCL$_2$ IN LI/SOCL$_2$ BATTERY

BACKGROUND OF THE INVENTION

Recent developments in the electrochemical art have required electrochemical cells with a very high rate of discharge. Because of its high potential, lithium-thionyl chloride batteries would be particularly suitable for many applications if the rate of discharge could be improved. Current density, which is proportional to the rate at which a cell may be discharged, must be increased if a practical cell of 150 milliamps per square centimeter discharge rate can be achieved.

DESCRIPTION OF THE INVENTION AND PREFERRED EMBODIMENT

It has now been discovered that the discharge rate of a lithium-thionyl chloride battery can be substantially increased in the following manner. Specifically, it has been discovered that a lithium-thionyl chloride cell having a lithium-anode, an electrolyte including thionyl chloride and a carbon or metal cathode can be modified to provide a cell having a substantially higher discharge rate, ranging from 50% to perhaps 2 or 3 times higher discharge rate. The improvement comprises the addition of a coating of a phthalocyanine complex on the cathode surface. Among the phthalocyanine complexes which are most preferred are the transition metal phthalocyanine complexes, such as nickel, copper, cobalt and the like, and polymeric phthalocyanines, and substituted phthalocyanines.

The present invention is applicable to any lithium thionyl chloride cell, and is particularly suited for improving the rate of discharge of those cells in which the cathode is a metal such as platinum, nickel, stainless steel, and the like. Additionally, the invention is admirably suited to improving those cells in which the cathode is carbon in one form or another, such as glassy carbon disks.

In order to apply the phthalocyanine complex coating, a solution of a complex such as cobalt phthalocyanine or copper phthalocyanine is made in an organic solvent in an amount preferably ranging from about 2 to about 10 percent by weight. Typical solvents are tetrahydrofuran, dimethylformamide, trichloroethylene, acetonitrile, nitromethane and the like. The cathode materials, such as platinum or glassy carbon or whatever, are dipped into the solution, removed and dried in a vacuum oven. Typically, 15 minutes at approximately 150° C. is adequate for removal of the solvent. A thin coating of the phthalocyanine complex is then remaining on the cathode.

A number of experiments were performed using various phthalocyanine complexes in lithium thionyl chloride cells. In each case, those cells which included a phthalocyanine complex on the cathode had from 50% to far more than 100% greater rate of discharge, as measured by the current produced. Presented below in the table are results demonstrating the superior performance of the present invention. It was also noted, in every case, that the reduction potential for the coated cathode of the present invention had shifted to a marked positive value by about 100 millivolts when compared to the uncoated cathodes. Having a positive reduction potential of even this amount tends to operate the cell at a lower temperature, and less heat is generated during rapid discharge.

TABLE I

| Cathode Collector | Additive | Current ($\mu$A) |
|---|---|---|
| carbon, glassy | — | 660 |
| carbon, glassy | cobalt phthalocyanine | 2200 (10% coated) |
| platinum | — | 400 |
| platinum | cobalt phthalocyanine | 600 (5% coated) |
| platinum | copper phthalocyanine | 580 (5% coated) |

Having thus described the invention, what is claimed is:

1. In a lithium-thionyl chloride cell having a lithium anode, and electrolyte include thionyl chloride, and a cathode, the improvement comprising a coating of phthalocyanine complex on said cathode.

2. The cell of claim 1 wherein said phthalocyanine complex is a transition metal phthalocyanine complex.

3. The cell of claim 2 wherein said transition metal is selected from copper and cobalt.

4. The cell of claim 1 wherein said cathode is a metal.

5. The cell of claim 4 wherein said metal is selected from the group consisting of platinum, nickel and stainless steel.

6. The cell of claim 1 wherein said cathode is carbon.

7. The cell of claim 1 wherein said complex is applied to said cathode by vacuum drying a cathode which has been contacted with a solution of metal complex dissolved in a solvent.

8. The cell of claim 7 wherein said solution contains 2% to 10% by weight of said complex.

9. The cell of claim 8 wherein said solvent is selected from the group consisting of tetrahydrofuran, dimethylformamide, trichloroethylene, acetonitrile, and nitromethane.

10. The cell of claim 9 wherein said phthalocyanine complex is a transition metal complex selected from the group consisting of copper and cobalt.

* * * * *